United States Patent
Iijima et al.

(10) Patent No.: US 8,007,908 B2
(45) Date of Patent: Aug. 30, 2011

(54) SINGLE WALLED CARBON NANOHORN ADSORPTIVE MATERIAL AND METHOD FOR PRODUCTION THEREOF

(75) Inventors: Sumio Iijima, Aichi (JP); Katsuyuki Murata, Ibaraki (JP); Katsumi Kaneko, Chiba (JP); Masako Yudasaka, Ibaraki (JP)

(73) Assignees: Japan Science and Technology Agency, Saitama (JP); NEC Corporation, Tokyo (JP)

( * ) Notice: Subject to any disclaimer, the term of this patent is extended or adjusted under 35 U.S.C. 154(b) by 913 days.

(21) Appl. No.: 10/560,808

(22) PCT Filed: May 31, 2004

(86) PCT No.: PCT/JP2004/007848
§ 371 (c)(1),
(2), (4) Date: Mar. 20, 2006

(87) PCT Pub. No.: WO2004/112955
PCT Pub. Date: Dec. 29, 2004

(65) Prior Publication Data
US 2006/0165992 A1    Jul. 27, 2006

(30) Foreign Application Priority Data
Jun. 18, 2003   (JP) ................... 2003-174016

(51) Int. Cl.
  *B32B 9/00* (2006.01)
(52) U.S. Cl. ............................ 428/408; 977/742
(58) Field of Classification Search ............... 428/408; 977/742; 423/447.1
See application file for complete search history.

(56) References Cited

U.S. PATENT DOCUMENTS

| 6,706,431 B2 * | 3/2004 | Kawamura et al. ............ 429/13 |
| 2004/0241445 A1 * | 12/2004 | Yudasaka et al. ............ 428/408 |

FOREIGN PATENT DOCUMENTS

| JP | 2001-64004 | 3/2001 |
| JP | 2001-212453 A | 8/2001 |
| JP | 2002-326032 A | 11/2002 |
| JP | 2003-292316 A | 10/2003 |
| JP | 2004-16976 A | 1/2004 |
| WO | WO 03/006361 | 1/2003 |

* cited by examiner

*Primary Examiner* — David Sample
*Assistant Examiner* — Daniel Miller
(74) *Attorney, Agent, or Firm* — Wenderoth, Lind & Ponack, L.L.P.

(57) ABSTRACT

A single walled carbon nanohorn adsorptive material which comprises a single walled carbon nanohorn and a lanthanide metal deposited thereon and has methane absorptivity is produced, whereby a single walled carbon nanohorn adsorptive material which can adsorb much methane and is effective as a methane adsorbing material is provided.

6 Claims, 6 Drawing Sheets

SINGLE WALLED CARBON NANOHORN ADSORPTIVE MATERIAL AND METHOD FOR PRODUCTION THEREOF

TECHNICAL FIELD

This invention relates to a single walled carbon nanohorn adsorptive material and a method for producing the same. More particularly, this invention relates to a single walled carbon nanohorn adsorptive material, which can adsorb much methane and is effective as a methane adsorbing material, and a method for producing the same.

BACKGROUND ART

A single walled carbon nanohorn is a tubular carbon nanotube that has a horn-like sharp-pointed conical shape at the tip end, and is composed mainly of a carbon atomic plane with graphite structure in the same manner as a carbon nanotube. This single walled carbon nanohorn is generally produced in the form of a so-called dahlia-like carbon nanohorn aggregate in which a number of single walled carbon nanohorns are aggregated in the form of a sphere with a diameter of about 80 to 100 nm and with the conical tip portion of each carbon nanohorn being disposed on the outer side. The carbon nanohorn aggregate has a very large surface area, and large quantity synthesis thereof with high purity is easy, and therefore it is expected to be useful as an adsorptive material or the like which is lightweight and low in cost (Patent Document 1 (JP-A-2002-159851) and Patent Document 2 (JP-A-2002-326032)).

On the other hand, in order to solve energy problems or environmental problems, there recently are expectations that methane, an ingredient of natural gas, will become an alternative to fuels such as coal or petroleum, and various storage methods for methane have been proposed. For example, various carbon adsorptive materials such as activated carbons, activated carbon fibers and activated carbons with high specific surface area, metal complexes and the like are prospective methane adsorbing materials.

As a carbon adsorptive material for adsorbing methane, a single walled carbon nanohorn (SWNH) is suitable because of the characteristics described above. SWNH can adsorb methane in higher density than other carbon materials, and thus is expected to be an excellent methane adsorbing material. However, at present, it is just about at or slightly below the standards for practical application (U.S. Department of Energy: 35 atmospheric pressure, 150 v/v). Incidentally, as shown in FIG. 6, by heating SWNH (squares (□) in FIG. 6 (heating to 693 K)), it is possible to increase the amount of adsorbed methane compared with unheated SWNH (circles (○) in FIG. 6 (303 K)). In this case, however, though the amount of adsorbed methane is larger than the triangles (Δ) of FIG. 6 (A20: an activated carbon fiber (303 K)) or the inverted triangles (∇) (AX21: an activated carbon with high specific surface area (303 K)), a significant difference in the amount of adsorbed methane is not observed compared with the lozenges (◇) (A5: an activated carbon fiber (303 K)), and further improvement of the amount of adsorbed methane has been desired.

Accordingly, this invention has been made in view of the above-mentioned circumstances, and an object of this invention is to provide a single walled carbon nanohorn adsorptive material, which solves the problems of the prior art and is useful as a novel methane adsorbing material that adsorbs much methane and can store methane.

DISCLOSURE OF THE INVENTION

In order to achieve the above-mentioned object, the invention of this application provides firstly a single walled carbon nanohorn adsorptive material, characterized by comprising a lanthanide metal deposited on a single walled carbon nanohorn, and having an absorptivity for methane.

Secondly, the invention of this application provides a single walled carbon nanohorn adsorptive material, characterized in that a lanthanide metal is deposited on a single walled carbon nanohorn in an amount not less than 0.01 mmol and not more than 5 mmol per 1 g of the single walled carbon nanohorn.

Thirdly, it provides, in the first or the second invention, the single walled carbon nanohorn adsorptive material, characterized in that the lanthanide metal is any of the group consisting of La, Ce, Pr, Nd, Pm, Sm, Eu, Gd and Tb.

Fourthly, it provides a method for producing a single walled carbon nanohorn adsorptive material, characterized in that a lanthanide metal is deposited on a single walled carbon nanohorn by suspending single walled carbon nanohorns in ethanol, adding a predetermined amount of an ethanolic lanthanide nitrate solution, performing sonication, and evaporating to dryness.

Fifthly, it provides, in the fourth invention, the method for producing a single walled carbon nanohorn adsorptive material, characterized in that the single walled carbon nanohorns are oxidized by heating in flowing oxygen before suspending it in ethanol.

BEST MODE FOR CARRYING OUT THE INVENTION

This invention has the aspects as described above, however, an embodiment of this invention will be described hereinafter.

A single walled carbon nanohorn adsorptive material of this invention is mainly characterized by comprising a lanthanide metal deposited on a single walled carbon nanohorn, and having an absorptivity for methane. Such a single walled carbon nanohorn adsorptive material can adsorb a greater amount of methane than a common single walled carbon nanohorn. Particularly, it is preferred that the deposited amount is set to be 0.01 mmol or more and 5 mmol or less per 1 g of the single walled carbon nanohorn. By depositing the lanthanide metal on the single walled carbon nanohorn in such an amount, the amount of methane adsorbed on the single walled carbon nanohorn adsorptive material can be further improved.

Figure 1:
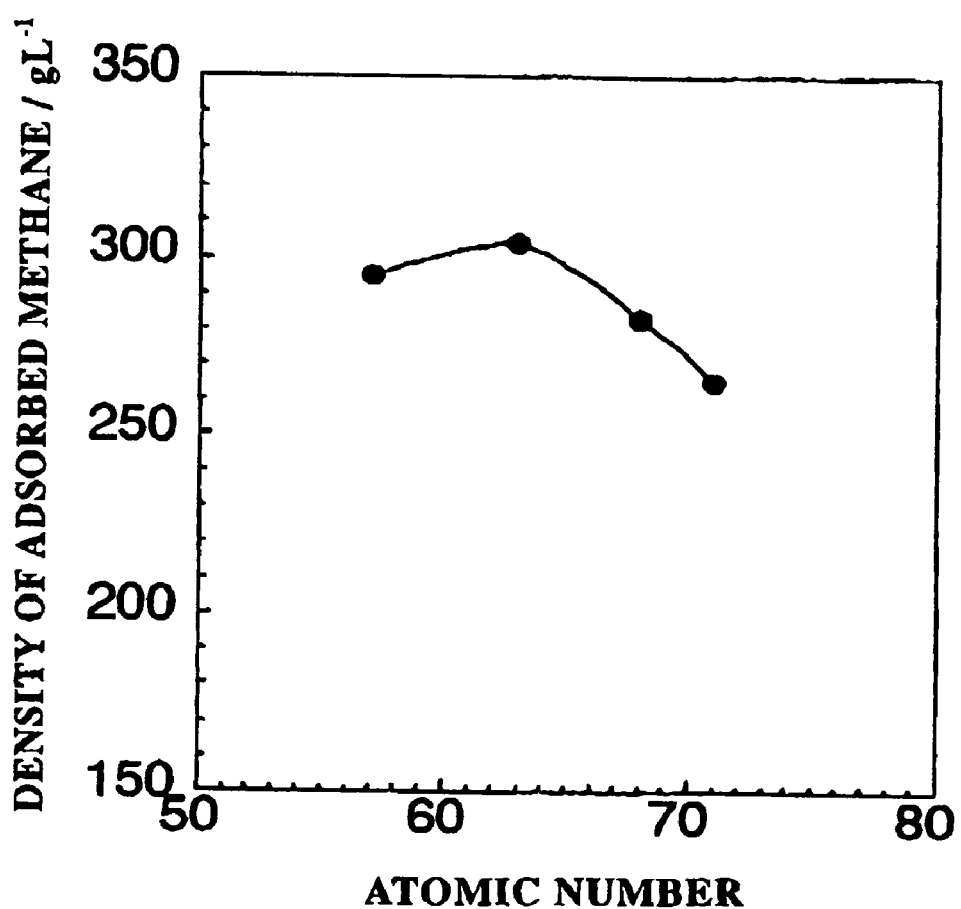
FIG. 1 is a graph showing the difference in the density of adsorbed methane depending on the atomic number of lanthanide metal of a single walled carbon nanohorn adsorptive material of this invention.

At this time, it is of course possible to use another lanthanide metal, and particularly, any of the group consisting of La, Ce, Pr, Nd, Pm, Sm, Eu, Gd and Tb is a preferable selection of lanthanide metal. The single walled carbon nanohorn adsorptive material on which any of these lanthanide metals is deposited can adsorb methane with particularly high efficiency, as shown in FIG. 1, and it can be extremely useful as a methane adsorbing material. Incidentally, the horizontal axis of FIG. 1 indicates the atomic number of lanthanide metal, and the vertical axis indicates the density of adsorbed methane on a single walled carbon nanohorn adsorptive material on which a lanthanide metal is deposited.

Incidentally, methane adsorbed on the single walled carbon nanohorn adsorptive material on which a lanthanide metal is deposited can be easily and promptly released from the single walled carbon nanohorn adsorptive material merely by reducing the pressure.

In addition, the single walled carbon nanohorn adsorptive material of this invention can be preferably produced by a method in which a lanthanide metal is deposited on a single walled carbon nanohorn by suspending a single walled carbon nanohorn in ethanol, adding a predetermined amount of an ethanolic lanthanide nitrate solution, performing sonication, and evaporating to dryness. Further, by oxidizing the single walled carbon nanohorn by heating in flowing oxygen before suspending it in ethanol, the pore volume of the single walled carbon nanohorn can be increased. Therefore, though the density of adsorbed methane on the single walled carbon nanohorn on which a lanthanide metal is deposited by undergoing heating and oxidation becomes smaller compared with the single walled carbon nanohorn on which a lanthanide metal is deposited without undergoing heating and oxidation, it is possible to increase the total amount of adsorbed methane.

Further, since the single walled carbon nanohorn (SWNH) in this invention is generally produced as an aggregate, a lanthanide metal may be deposited on single walled carbon nanohorns of this aggregate structure or may be deposited on each single carbon nanohorn.

Hereinafter, examples will be shown with reference to the accompanying drawings and an embodiment of this invention will be described further in detail. Of course, this invention is not limited to the following examples, and it is needless to say that various embodiments are possible in detailed portions.

EXAMPLES

Example 1

A single walled carbon nanohorn adsorptive material on which a lanthanide metal was deposited was obtained by suspending in ethanol single walled carbon nanohorns (SWNH) which had been prepared by a so-called laser-ablation method, in which a solid carbon single substance was irradiated with a laser beam under an inert gas atmosphere so as to perform laser evaporation of carbon, adding a predetermined amount of an ethanolic lanthanide nitrate solution, performing sonication for 5 minutes, and evaporating to dryness. The lanthanides used were La, Eu, Er and Lu, and the deposited amount was 0.1 mmol per 1 g of SWNH, respectively. Incidentally, by way of comparison, an activated carbon fiber A10 was subjected to the same treatment in the same manner as above, whereby a lanthanide metal was deposited thereon. The lanthanide deposited on the activated carbon fiber A10 was Eu, and the deposited amount of the lanthanide metal was 0.1 mmol per 1 g of A10.

When the pore structures of the respective carbon materials were confirmed by nitrogen adsorption measurement at 77 K, change in the pore volume due to deposit of a lanthanide metal was hardly observed at all, as shown in Table 1. In addition, the surface area was hardly changed at all.

TABLE 1

| Sample | Surface area ($m^2g^{-1}$) | Pore volume ($mLg^{-1}$) |
| --- | --- | --- |
| SWNH as grown | 310 | 0.11 |
| La/SWNH | 370 | 0.107 |
| Eu/SWNH | 340 | 0.101 |
| Er/SWNH | 350 | 0.101 |
| Lu/SWNH | 350 | 0.108 |
| A10 | 1010 | 0.46 |
| Eu/A10 | 1050 | 0.46 |

Figure 2:
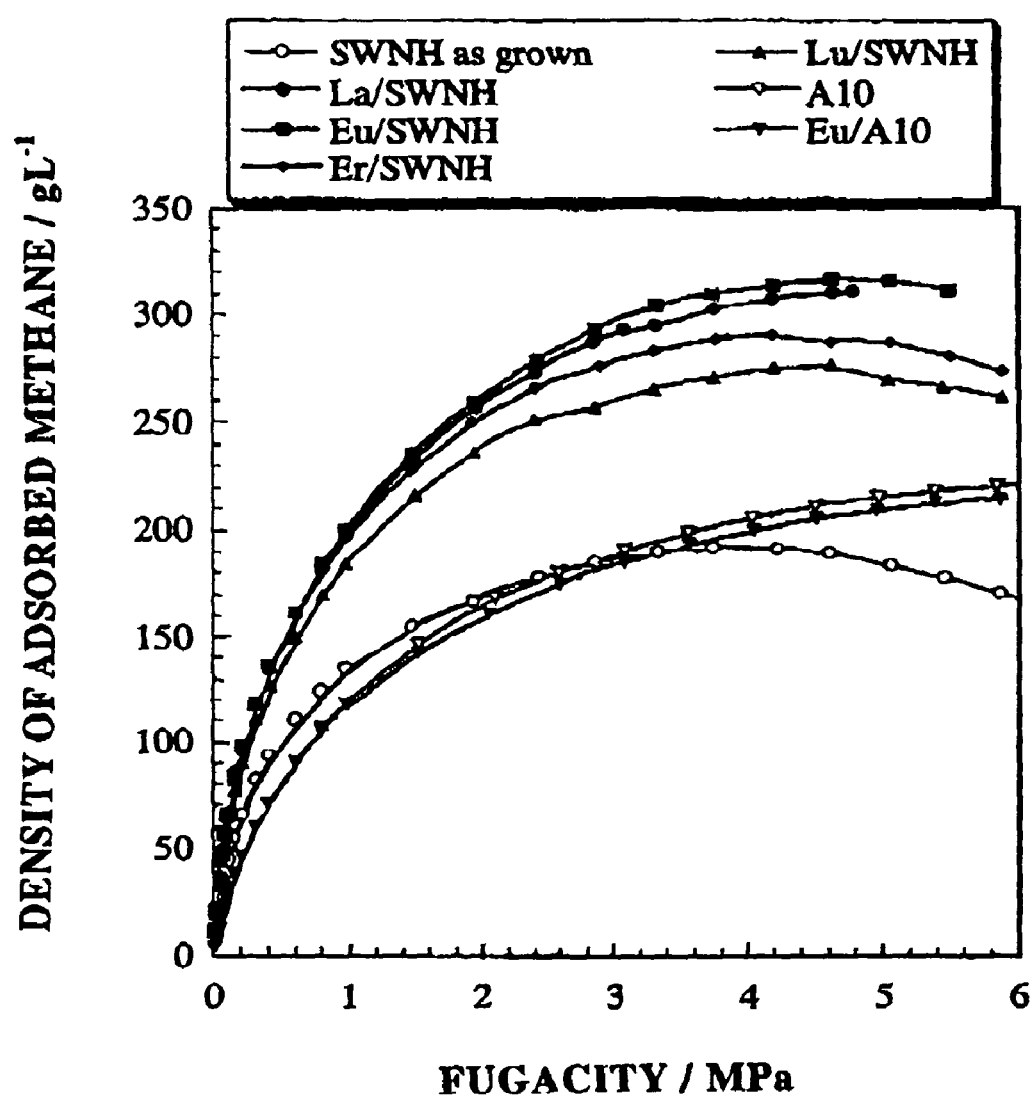
FIG. 2 is a graph showing the results of measuring the density of adsorbed methane on a single walled carbon nanohorn adsorptive material of the invention of this application, a common single walled carbon nanohorn and an activated carbon fiber.

Subsequently, measurements of adsorbed methane on the respective carbon materials were carried out at 303 K and 35 atm. As shown in FIG. 2, the density of adsorbed methane on the single walled carbon nanohorns on which a lanthanide metal was deposited (blackened circles: La/SWNH, blackened squares: Eu/SWNH, blackened lozenges: Er/SWNH, and blackened triangles: Lu/SWNH in FIG. 2) was increased about 1.5-fold compared with the single walled carbon nanohorn on which a lanthanide metal was not deposited (open circles in FIG. 2). In particular, it is found that a carbon nanohorn on which Eu or La was deposited could adsorb methane with still higher efficiency than the carbon nanohorn on which Er or Lu was deposited. On the other hand, as for A10 (open inverted triangles in FIG. 2), even when a lanthanide metal (Eu) was deposited thereon, an effect of increasing the density of adsorbed methane was not observed (blackened inverted triangles in FIG. 2).

Figure 3:
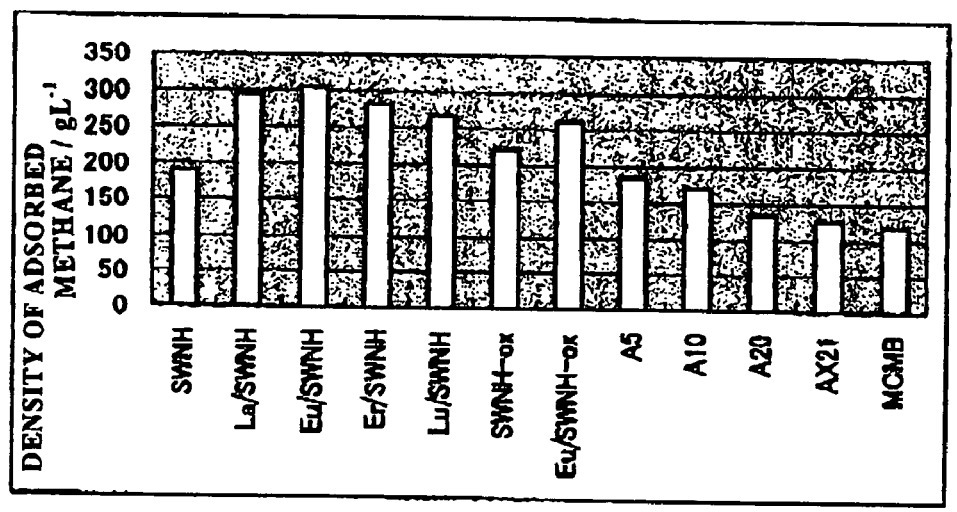
FIG. 3 is a bar graph showing the results of measuring the density of adsorbed methane on a single walled carbon nanohorn adsorptive material of this invention, a common single walled carbon nanohorn, an activated carbon fiber and another carbon material.

In addition, the bar graph in FIG. 3 shows the results of measuring the density of adsorbed methane on untreated SWNH, SWNH oxidized at a high temperature (SWNH-ox in FIG. 3), SWNH on which a lanthanide metal was deposited (La/SWNH, Eu/SWNH, Er/SWNH and Lu/SWNH in FIG. 3), and SWNH on which a lanthanide metal was deposited and which then was oxidized at a high temperature (Eu/SWNH-ox). Also, for comparison, measurements of the density of adsorbed methane on the prospective methane adsorbing materials A5 (an activated carbon fiber), A10 (an activated carbon fiber), A20 (an activated carbon fiber), AX21 (an activated carbon with high specific surface area) and MCMB (activated mesocarbon microbeads) were also carried out.

From FIG. 3, it was found that the density of adsorbed methane on SWNH on which a lanthanide metal was deposited is larger than the density of adsorbed methane on other carbon materials.

Example 2

Subsequently, a single walled carbon nanohorn (SWNH) prepared by a laser-ablation method was oxidized at 693 K in flowing oxygen and suspended in ethanol, and a predetermined amount of an ethanolic lanthanide nitrate solution was added. Then, sonication was performed for 5 minutes, and the mixture was evaporated to dryness. The lanthanide used was Eu, and the deposited amount was 0.1 mmol per 1 g of SWNH. By way of comparison, the density of adsorbed methane on SWNH oxidized at 693 K in flowing oxygen was measured. The results are shown in Table 2 and FIG. 4.

TABLE 2

| Sample | Surface area ($m^2g^{-1}$) | Pore volume ($mLg^{-1}$) |
|---|---|---|
| SWNH-ox | 1010 | 0.47 |
| Eu/SWNH-ox | 780 | 0.33 |

Figure 4:
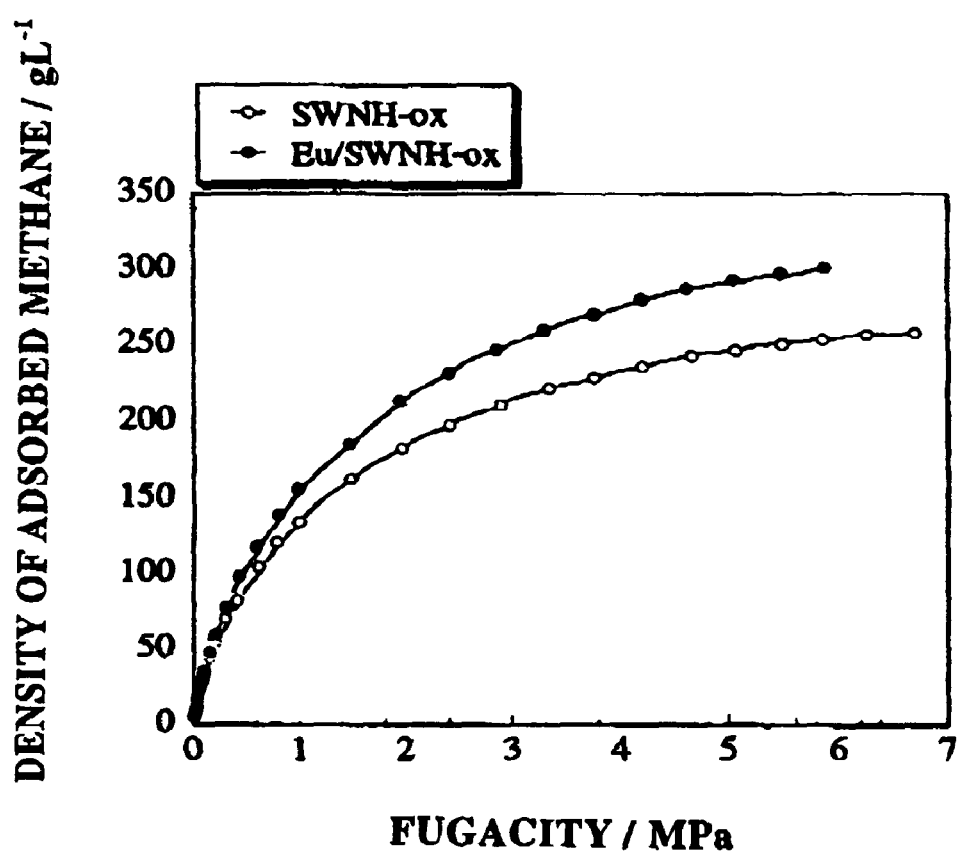
FIG. 4 is graph showing the density of adsorbed methane on SWNH and Eu/SWNH-ox in example of this invention.

In this case, the pore volume was slightly decreased by depositing Eu as shown in Table 2; however, it is seen in FIG. 4 that the density of adsorbed methane was increased.

In addition, as is clear from Table 2, the pore volume of SWNH that undergoes heating and oxidation becomes larger than that of the SWNH shown in Table 1 that does not undergo heating and oxidation.

Example 3

Figure 5:
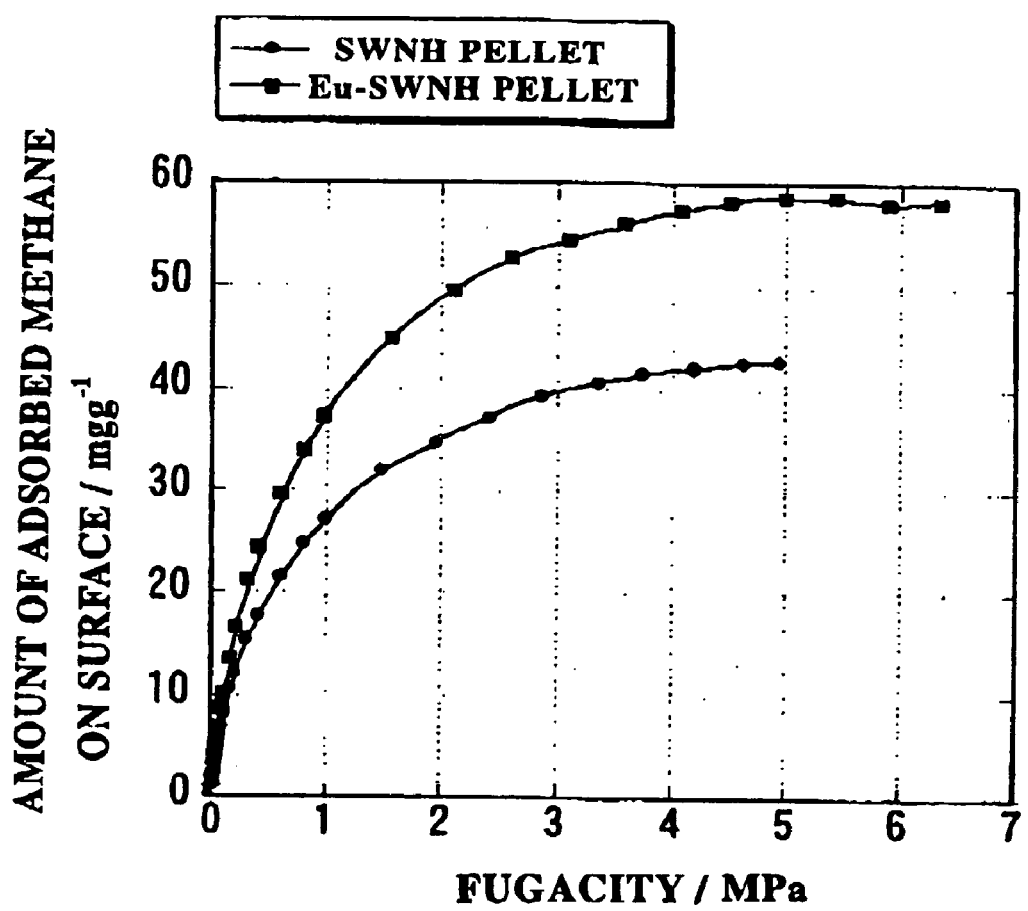
FIG. 5 is a graph showing the amount of adsorbed methane on SWNH pellet and Eu/SWNH-ox pellet in example of this invention.
Figure 6:
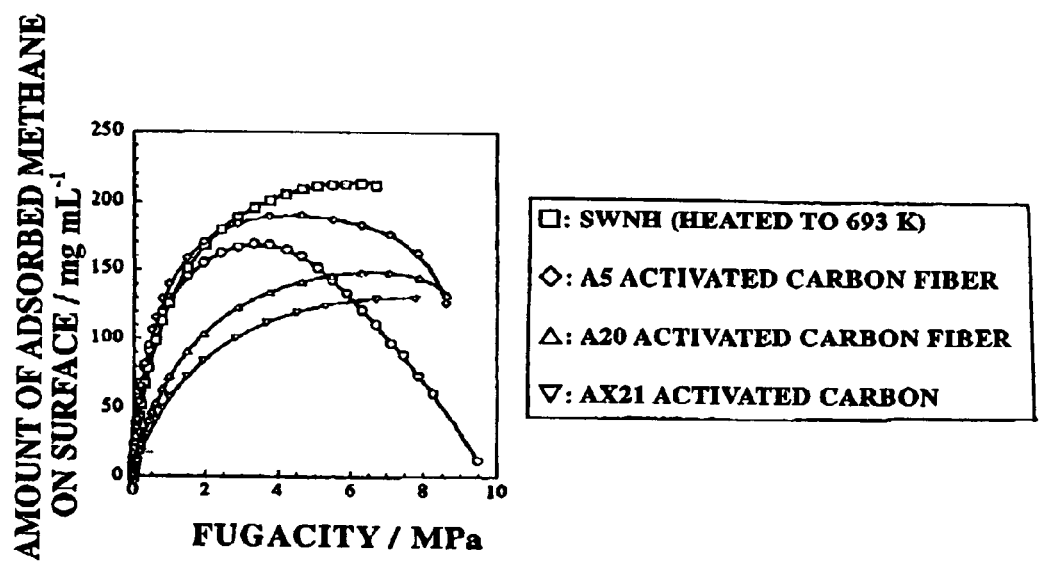
FIG. 6 is a graph showing the amount of adsorbed methane on a conventional SWNH (heated or unheated), an activated carbon fiber and an activated carbon.

SWNH prepared by a laser-ablation method was suspended in ethanol, and a predetermined amount of an ethanolic lanthanide nitrate solution was added. Then, sonication was performed for 5 minutes, and the mixture was evaporated to dryness. Thereafter, the sample was pelletized with a pellet forming machine. The lanthanide used was Eu, and the deposited amount was 0.1 mmol per 1 g of SWNH. The results of measuring the amount of adsorbed methane thereon are shown in FIG. 5. In addition, for comparison, a SWNH sample was prepared by a laser-ablation method was suspended in ethanol and pelletized with a pellet forming machine. From FIG. 5, it is found that also in this case, the amount of adsorbed methane on the SWNH pellet on which Eu was deposited was 1.5-fold that of the usual SWNH pellet.

INDUSTRIAL APPLICABILITY

As described above in detail, by this invention, a single walled carbon nanohorn adsorptive material, which can adsorb much methane and is effective as a methane adsorbing material, and a method for producing the same are provided.

The invention claimed is:

1. A single walled carbon nanohorn adsorptive material having methane absorptivity, wherein a lanthanide metal is deposited on a single walled carbon nanohorn.

2. The single walled carbon nanohorn adsorptive material according to claim 1, wherein the lanthanide metal is deposited on the single walled carbon nanohorn in an amount not less than 0.01 mmol and not more than 5 mmol per 1 g of the single walled carbon nanohorn.

3. The single walled carbon nanohorn adsorptive material according to claim 1, wherein the lanthanide metal is any of the group consisting of La, Ce, Pr, Nd, Pm, Sm, Eu, Gd, Lu and Tb.

4. The single walled carbon nanohorn adsorptive material according to claim 2, wherein the lanthanide metal is any of the group consisting of La, Ce, Pr, Nd, Pm, Sm, Eu, Gd, Lu and Tb.

5. A method for producing a single walled carbon nanohorn adsorptive material, wherein a lanthanide metal is deposited on a single walled carbon nanohorn by suspending a single walled carbon nanohorn in ethanol, adding a predetermined amount of an ethanolic lanthanide nitrate solution, performing sonication, and evaporating to dryness.

6. The method for producing a single walled carbon nanohorn adsorptive material according to claim 5, wherein the single walled carbon nanohorn is oxidized by heating in flowing oxygen before suspending it in ethanol.

* * * * *